United States Patent [19]

Maekawa et al.

[11] Patent Number: 4,759,653

[45] Date of Patent: Jul. 26, 1988

[54] WIRE FIXING DEVICE FOR WINDOW REGULATOR

[75] Inventors: Junichi Maekawa; Akihiro Takeda, both of Yokohama, Japan

[73] Assignee: Ohi Seisakusho Co., Ltd., Yokohama, Japan

[21] Appl. No.: 25,179

[22] Filed: Mar. 12, 1987

[30] Foreign Application Priority Data

Mar. 20, 1986 [JP] Japan .......................... 61-39957[U]

[51] Int. Cl.[4] ...................... F16G 11/00; E05F 11/48

[52] U.S. Cl. ...................................... 403/24; 403/353; 403/360; 49/352

[58] Field of Search ...................... 403/24, 331, 353, 6, 403/360; 49/352; 24/114.5

[56] References Cited

U.S. PATENT DOCUMENTS

| | | | |
|---|---|---|---|
| 2,123,783 | 7/1938 | Keltner | 403/360 |
| 3,100,323 | 8/1963 | Baker | 403/360 X |
| 3,427,748 | 2/1969 | Marr | 49/352 |
| 3,870,357 | 3/1975 | Wernsing | 24/114.5 |
| 3,890,743 | 6/1975 | Eckhardt et al. | 49/352 |
| 4,058,339 | 11/1977 | Burchard, Jr. | 403/331 X |
| 4,109,417 | 8/1978 | Fogarollo | 49/352 |
| 4,201,014 | 5/1980 | Hess | 49/352 X |
| 4,494,336 | 1/1985 | Ishii et al. | 49/352 |
| 4,637,166 | 1/1987 | Ujihara | 49/352 |
| 4,648,206 | 3/1987 | Moriya et al. | 49/352 |
| 4,663,886 | 5/1987 | Nakamura et al. | 49/352 X |

FOREIGN PATENT DOCUMENTS

| | | |
|---|---|---|
| 0164114 | 12/1985 | European Pat. Off. . |
| 3049921 | 6/1983 | Fed. Rep. of Germany . |
| 950827 | 2/1964 | United Kingdom . |
| 1369238 | 10/1974 | United Kingdom . |
| 2113294 | 8/1983 | United Kingdom . |

*Primary Examiner*—Randolph A. Reese
*Assistant Examiner*—Peter M. Cuomo
*Attorney, Agent, or Firm*—Foley & Lardner, Schwartz, Jeffery, Schwaab, Mack, Blumenthal & Evans

[57] ABSTRACT

In a wire fixing device for a window regulator for an automotive vehicle, for instance, a wire stopper fixed to a wire is engaged with a recess formed in a wire fixing member fixed to a window panel carry unit slidable along two guide rails when the carry plate unit is moved to and fro by the wire. The wire fixing member is, in particular, formed with a slit for allowing only the wire to pass across the wire fixing member in the direction perpendicular to the wire extending direction, and fixed to the window panel carry unit in constained beam fashion. To engage the wire stopper with the recess, the wire fixing member is first dislocated from the wire stopper within an access hole, the wire is raised passing through the slit by holding the wire through the access hole; and the wire fixing member is slided just under the wire stopper. This device is small in size, high in rigidity and easy to assemble the wire to the window panel carry unit.

4 Claims, 5 Drawing Sheets

WIRE FIXING DEVICE FOR WINDOW REGULATOR

BACKGROUND OF THE INVENTION

1. Field of the Invention

The present invention relates to a wire fixing device for a window regulator mounted in an automotive vehicle, and more specifically to a wire fixing device for a window regulator, which is easy to install within a narrow inner door space without reducing the strength of the wire fixing device.

2. Description of the Prior Art

Usually, an automotive vehicle is provided with a plurality of window regulators each for moving a window glass up and down with a wire by rotating a window drive shaft manually or by a motor (in the case of a power window). In the window regulator, a window glass is supported by a window panel carry unit slidable up and down along guide rails, a wire is fixed to the window panel carry unit via a wire fixing member and the wire is taken up by a wire drive shaft to move the window up and down.

An example of prior-art wire fixing devices for a window regulator is shown in FIGS. 1 and 2. In these drawings, a glass panel carry plate 101 for supporting a window panel is slidably supported by a guide rail 103. A wire stopper 105 is fixed to a wire 107. The wire 107 is fixed to the panel carry plate 101 by engaging the wire stopper 105 with a wire fixing member 110. In more detail, the wire fixing member 110 is made up of a synthetic resin formed integral with a tongue portion **101*a* of the panel carry plate 101. This tongue portion 101*a* is formed by punching the glass panel carry plate 101 into a U-shaped access hole 101*b* and bending the middle portion thereof at a right angle, as shown in FIG. 2**.

In engaging the wire stopper 105 with the wire fixing member 110, the wire stopper 105A as shown by dashed circles in FIG. 2 is first pulled up and then pushed sideward into the wire stopping member 110 passing through the access hole **101*b*** horizontally.

In the prior-art wire fixing device as described above, however, there exist the following shortcomings: (1) since the wire fixing member 110 is supported by the tongue portion **101*a* of the carry plate 101 in cantilever fashion, the strength of the fixing member 110 is not satisfactorily strong; (2) since the height H (shown in FIG. 2) of the fixing member 110 is relatively large, it is difficult to install the wire fixing member within a relatively narrow inner space formed between an inner panel and an outer panel of a vehicle door; and (3) since the wire stopper 105 is engaged or fixed to the fixing member 110 through two steps of moving the wire first upward and then sideward, it is difficult to engage the stopper 105 with the fixing member 110** in an automatic assembly line; that is, automation of the assembly of the window regulator is more difficult.

SUMMARY OF THE INVENTION

With these problems in mind, therefore, it is the primary object of the present invention to provide a wire fixing device for a window regulator which is small in size, high in strength and which facilitates automation of the assembling line.

To achieve the above-mentioned object, in a wire fixing device for a window regulator, for fixing a wire stopper attached to a wire to a window panel carry unit via a wire fixing member so that the window panel carry unit is slidable along at least one guide rail when the panel carry unit is moved to and fro by the wire, the present invention is characterized in that said wire fixing member is supported by two parts of a carry plate of the carry plate unit in a constrained beam fashion and formed with a recess for receiving the wire stopper and with a slit for allowing only the wire to pass across the wire fixing member in a direction perpendicular to the wire.

The carry plate of the window panel carry plate unit is formed with an access hole with a length at least twice as long as a length of the wire fixing member in a longitudinal direction of the guide rail in order to dislocate the wire fixing member from the stopper so that the wire can pass through the slit of the wire fixing member before the stopper is engaged with the slit.

In assembly, the panel carry unit is first slid away from the wire stopper within an access hole formed in the carry plate, the wire is raised passing through the slit by holding the wire through the access hole, and the wire fixing member is slid just under the wire stopper before engaging the wire stopper with the recess of the wire fixing member.

BRIEF DESCRIPTION OF THE DRAWINGS

The features and advantages of the wire fixing device for a window regulator according to the present invention over the prior-art wire fixing device will be more clearly appreciated from the following description of the preferred embodiment of the invention taken in conjunction with the accompanying drawings, in which like reference numerals designate the same or similar elements or members and in which.

DETAILED DESCRIPTION OF THE PREFERRED EMBODIMENTS

Figure 3:
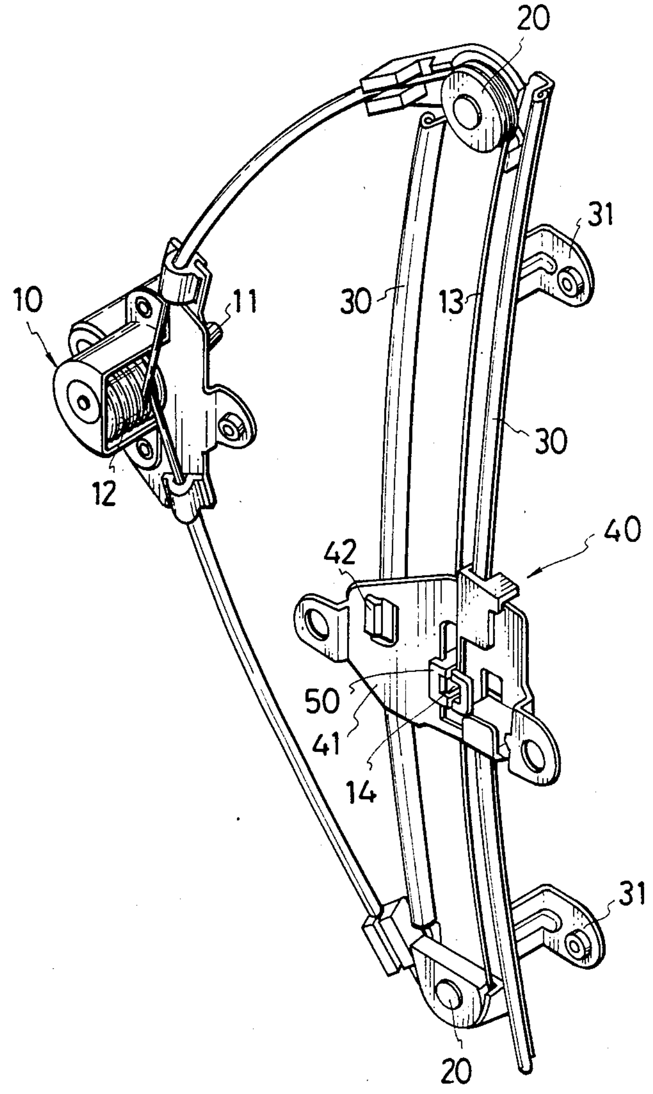
FIG. 3 is a perspective diagrammatical view showing an entire window regulator to which the wire fixing device according to the present invention is incorporated.
Figure 4:
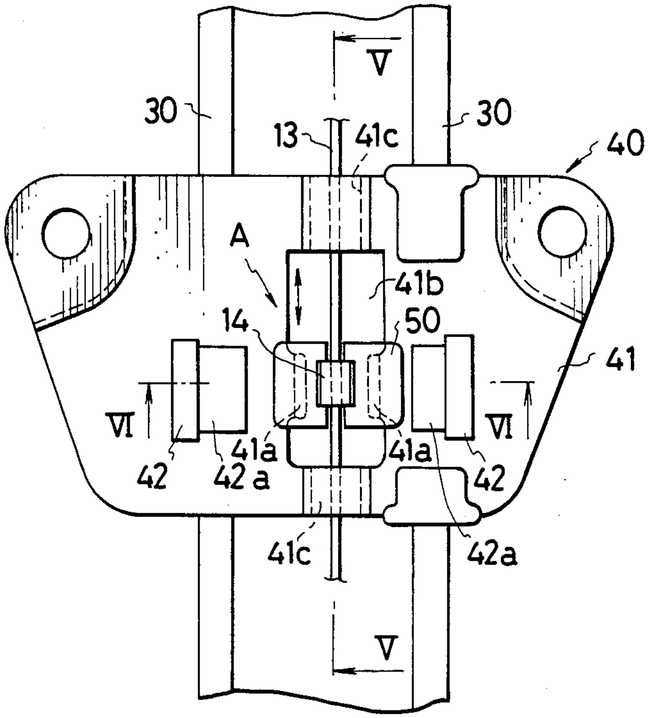
FIG. 4 is a plan view showing the wire fixing device for a window regulator according to the present invention.

With reference to FIG. 3, a window regulator for moving a window panel up and down will briefly be described.

The window regulator shown in FIG. 3 roughly comprises a window panel drive unit 10, a pair of pulleys 20, a pair of guide rails 30, and a window panel carry unit 40.

The window panel drive unit 10 includes a drive shaft 11 and a wire drum 12 fixed to the drive shaft 11. A wire 13 is wound around the wire drum 12, reeled through the two pulleys 20, and fixed to the window panel carry unit 40. When the drive shaft 11 is rotated manually with a handle (not shown), the wire 13 is wound around the wire drum 12. When the drive shaft 11 is rotated in the counterclockwise direction to shift the wire 13 downward along the guide rails 30, the window panel carry unit 40 is also moved downward along the rails 30 to open a door; when the drive shaft 11 is rotated in the clockwise direction to shift the wire 13 upward along the guide rail 30, the window panel carry unit 40 is moved upward along the rails 30 to close the door.

The guide rails 30 are fixed to an inner panel of a door via two upper and lower brackets 31.

The window panel carry unit 40 comprises a carry plate member 41 for fixing a window panel, two carry support members 42 slidably engaged with the guide rails 30, and a wire fixing member 50 of the present invention.

Figure 6:
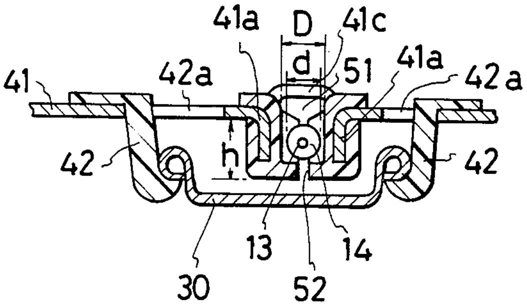
FIG. 6 is a cross-sectional view taken along the line VI—VI shown in FIG. 4.

The carry support members 42 are made of synthetic resin. Each of these members 42 is fitted to one of two square holes 42*a* formed in the carry plate member 41 so as to project from the under surface of the carry plate member 41. These two carry support members 42 are forceably fitted to the rail 30 (slidable pressure fit) as depicted in FIG. 6. Therefore, the carry plate member 41 is slidable along the guide rails 30 via these two carry support members 42 in the vertical direction.

Figure 5:
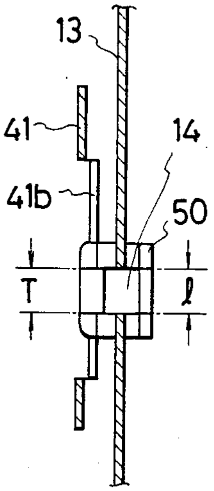
FIG. 5 is a cross-sectional view, partially in cross section, taken along the line V—V shown in FIG. 4.

At roughly the center of the window panel carry unit 40, there is disposed the wire fixing member 50. This member 50 is made of a synthetic resin and serves to fix a cylindrical wire stopper 14 tightly fixed to the wire 13 by caulking, for instance. The carry plate member 41 is formed with a square access hole 41*b* roughly at the center of the plate member 41 and a pair of tongue members 41*a* are formed by each bending a part of the carry plate member 41 located in the square access hole 41*b* at substantially a right angle with respect to the surface of the carry plate member 41. Therefore, the wire fixing member 50 is molded integral with these two tongue members 41*a* as depicted in FIG. 6. This wire fixing member 50 is formed with a box-shaped recess 51 to which the wire stopper 14 is fitted. The width D (see FIG. 6) of this recess 51 is a little wider than the diameter d of the wire stopper 14. However, it is also preferable to form the width D of this recess 51 so as to be equal to or a little smaller than the diameter d of the wire stopper 14 for providing a pressure fit of the wire stopper 14 into the recess 51 of this wire fixing member 50. On the other hand, the length T (see FIG. 5) of the recess 51 is almost the same as that 1 of the wire stopper 14. Therefore, when the wire stopper 14 is fitted or pressure fitted into the recess 51 of the wire fixing member 50, both the circular end surfaces of the wire stopper 14 are in contact with the end walls of the recess 51, so that when the wire 13 is moved up and down, the window panel carry unit 40 is moved up and down via the wire stopper 14 and the wire fixing member 50.

Figure 7:
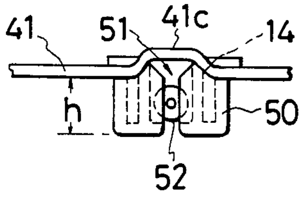
FIG. 7 is a front view when seen from under in FIG. 4.

Here, it should be noted that the wire fixing member 50 is formed with a slit 52 with a width a little wider than the diameter of the wire 13 as depicted in FIG. 7 through which the wire 13 can be passed when the wire fixing member 50 is dislocated from the wire stopper 14. Further, the carry plate member 41 is formed with two concave (in FIG. 6 or 7) portions 41*c* for reinforcement of the carry plate member 41.

Figures 8, 9, 10:
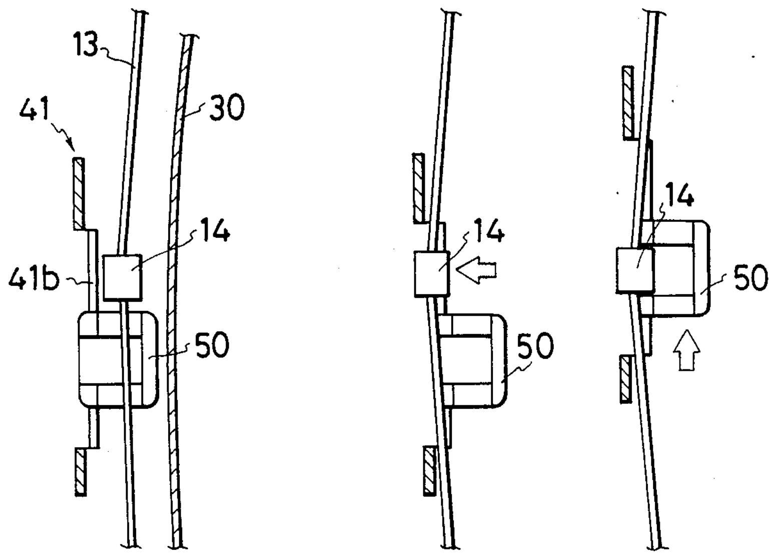
FIGS. 8, 9 and 10 are diagrammatical views, partially in cross section, for assistance in explaining the assembling work of the wire fixing device for a window regulator according to the present invention.

The procedure of assembling the wire stopper 14 with the wire fixing member 50 will be described hereinbelow with reference to FIGS. 8 to 10.

First, the panel carry unit 40 is assembled with the guide rail 30 by engaging the carry support members 42 with the rails 30. Then, the panel carry unit 40 is slid along the guide rails 30 in either direction to a position where the wire stopper 14 is dislocated away from the wire fixing member 50 as shown in FIG. 8. By catching the wire stopper 14 through the access hole 41*b* formed in the carry plate member 41, the wire 13 is raised passing through the slit 52 of the wire fixing member 50 to over the recess 51 as shown in FIG. 9. The wire fixing member 50 is slid along the guide rail 30 in either direction to a position where the wire stopper 14 comes just over the recess 51 of the wire fixing member 50 as shown in FIG. 10. Thereafter, the wire stopper 14 is loosely or pressure fitted to the recess 51 of the wire fixing member 50. Once the wire stopper 14 is fitted into the recess 51, since the wire 13 is fixed to the window panel carry unit 40 via the wire fixing member 50, the window panel carry unit 40 can be moved to and fro by the wire 13.

Figure 1:
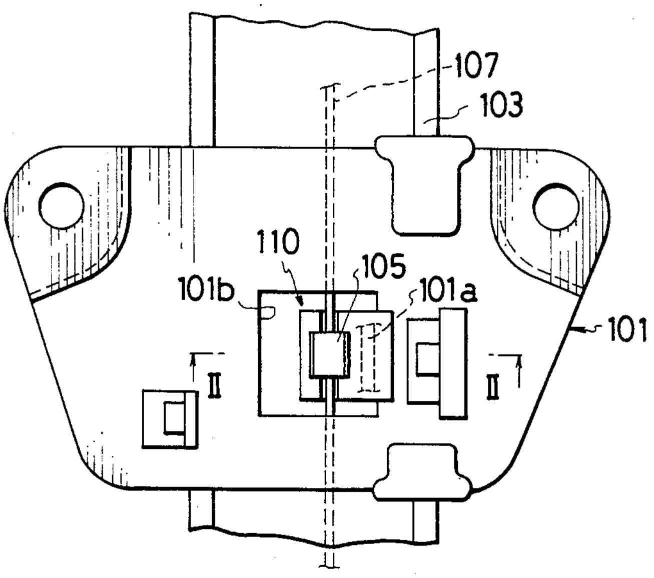
FIG. 1 (PRIOR ART)
FIG. 1 is a plan view showing a prior-art wire fixing device for a window regulator.
Figure 2:
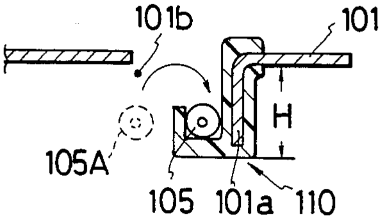
FIG. 2 (PRIOR ART)
FIG. 2 is a cross-sectional view taken along the line II—II in FIG. 1.

Here, it should be noted that the wire 13 can be fixed to the wire fixing member 50 by simply moving the wire in a single direction (perpendicular to the surface of the panel carry unit 40. Further, the wire fixing member 50 is supported by two tongue portions 41*a* of the carry plate member 41, so that the strength of the wire fixing member 50 can be improved as compared with the prior-art one (cantilever type) shown in FIG. 2. Furthermore, the height h (see FIG. 6 or 7) of the wire fixing member 50 can be minimized being different from the height H of the prior art member 110 shown in FIG. 2.

In contrast to the above assembling procedure, it is also possible to first fix the wire stopper 14 to the wire fixing member 50. In this procedure, after the wire 13 has been fixed to the window panel carry unit 40, one of the guide pulley 20 is removed; the panel carry unit 40 is fitted to the guide rails 30 from the side where the guide pulley 20 has been removed; the guide pulley is reassembled; the wire 13 is reeled around the reassembled pulley 20. In this procedure, since the wire stopper 14 can be fixed to the wire fixing member 50 within an open space and under the condition that the wire 13 is loosened, the assembling work is relatively easy.

What is claimed is:

1. A wire fixing device for a window regulator, for fixing a wire stopper attached to a wire to a window panel carry unit, comprising:

a wire fixing member having a recess for receiving the wire stopper and a slit for allowing only the wire to pass across the wire fixing member in a direction perpendicular to the wire, said recess and said slit extending along an axial length of said wire fixing member; and a window panel carry unit having two parts of a carry plate for supporting the wire fixing member in a constrained beam fashion, the window panel carry unit being slidable along at least one guide rail when it is moved to and fro by the wire and the carry unit being formed with an access hole having a length which extends at least twice the distance of the axial length of the wire fixing member in a longitudinal direction of the guide rail, the access hole permitting the wire fixing member to be separated from the wire stopper so that only the wire can pass through the slit of the wire fixing member before the stopper is engaged with the slit.

2. The wire fixing device as set forth in claim 1, wherein said stopper is loosely fit to said recess of said wire fixing member.

3. The wire fixing device as set forth in claim 1, wherein said stopper is pressure fit to said recess of said wire fixing member.

4. The wire fixing device as set forth in claim 1, wherein said wire fixing member is molded integral with two tongue members formed in the carry plate.

* * * * *